(12) United States Patent
Chandra

(10) Patent No.: US 9,195,851 B1
(45) Date of Patent: Nov. 24, 2015

(54) OFFLOADING ENCRYPTION TO THE CLIENT

(71) Applicant: EMC Corporation, Hopkinton, MA (US)

(72) Inventor: Surendar Chandra, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/207,078

(22) Filed: Mar. 12, 2014

(51) Int. Cl.
*H04L 29/06* (2006.01)
*G06F 21/62* (2013.01)
*H04L 9/08* (2006.01)

(52) U.S. Cl.
CPC .......... *G06F 21/6218* (2013.01); *H04L 9/0894* (2013.01)

(58) Field of Classification Search
CPC ..... H04L 9/083; H04L 9/0825; H04L 9/0822; H04L 9/14; H04L 63/0428

USPC .......................................................... 713/165
See application file for complete search history.

(56) References Cited

U.S. PATENT DOCUMENTS

| | | | |
|---|---|---|---|
| 6,240,514 B1 * | 5/2001 | Inoue et al. | 713/153 |
| 2004/0030898 A1 * | 2/2004 | Tsuria et al. | 713/171 |
| 2006/0126850 A1 * | 6/2006 | Dawson et al. | 380/284 |
| 2006/0143462 A1 * | 6/2006 | Jacobs | 713/181 |
| 2011/0261964 A1 * | 10/2011 | Kahler et al. | 380/286 |

* cited by examiner

*Primary Examiner* — Syed Zaidi
(74) *Attorney, Agent, or Firm* — Blakely, Sokoloff, Taylor & Zafman LLP

(57) ABSTRACT

Exemplary methods for offloading encryption to a client include receiving from a first client a first encrypted data and a corresponding first encrypted key, and decrypting the first encrypted key to recover a first key, without decrypting the first encrypted data. In one embodiment, the methods further include encrypting the first key using a second key to create a second encrypted key, wherein the second key is available only to the storage system, and storing the second encrypted key and the first encrypted data as received, without having to decrypt and re-encrypt the first encrypted data.

21 Claims, 10 Drawing Sheets

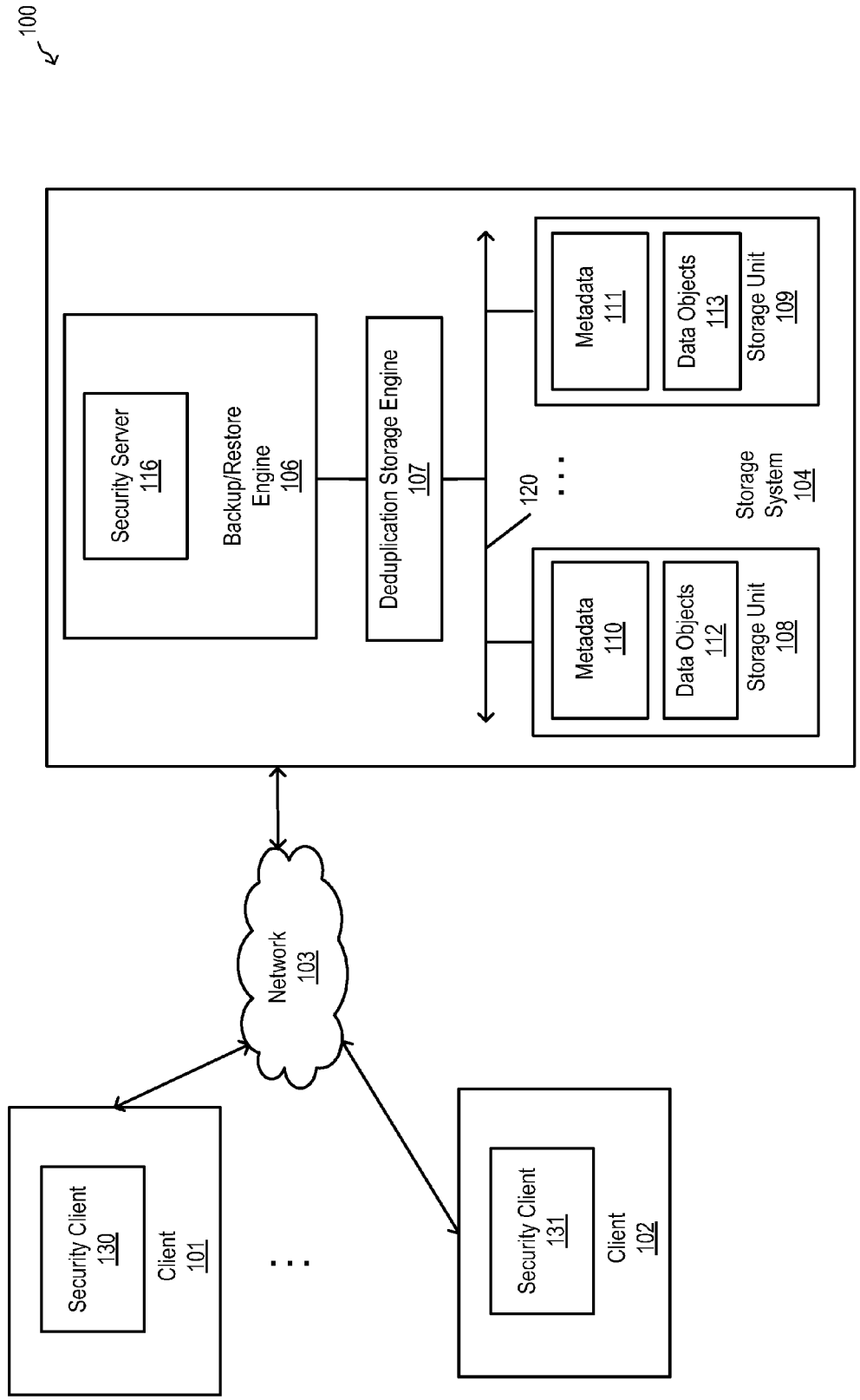

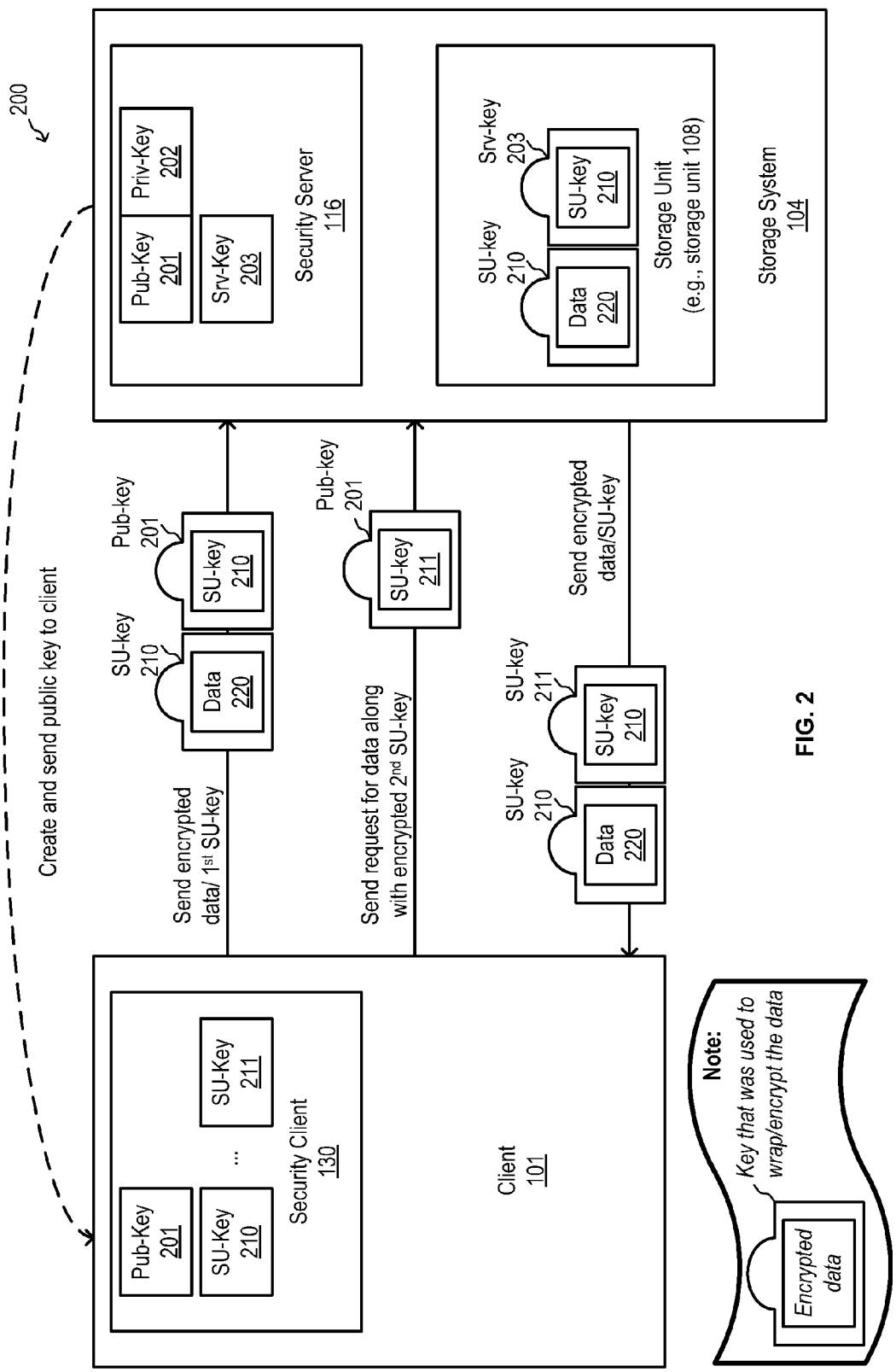

OFFLOADING ENCRYPTION TO THE CLIENT

FIELD

Embodiments of the invention relate to the field of storage systems; and more specifically, to mechanisms for offloading encryption to the client.

BACKGROUND

Storage systems typically support at-rest data encryption. As used herein, "at-rest data encryption" refers to the encryption of data that is stored at the storage system. When at-rest data encryption is enabled, all data stored at the storage system is encrypted using a single (symmetric) encryption key. Thus, accessing data stored at such a storage system requires the client to have this single symmetric encryption key. At-rest encryption is commonly available for both primary and archival tier storage systems.

There is also a growing need to support encryption-on-wire to protect data while in-flight. As used herein, encryption-on-wire refers to the encryption of data while it is traversing the network from the source (e.g., a client) to the target (e.g., a storage system). Conventionally, encryption-on-wire is implemented as follows: the data is encrypted by the network stack (e.g., Secure Sockets Layer (SSL)/Transport Layer Security (TLS)) at the source and then decrypted by the network stack at the target storage system.

Conventionally, in the case where both at-rest data encryption and encryption-on-wire are required, the data is encrypted by the network stack of the client. The encrypted data is then transmitted to the target storage system. When the encrypted data arrives at the target storage system, the data is decrypted by the network stack at the storage system. Once the data has been decrypted, the data is then re-encrypted for at-rest protection. Thus, computation resources are wasted at conventional storage systems.

BRIEF DESCRIPTION OF THE DRAWINGS

Embodiments of the invention are illustrated by way of example and not limitation in the figures of the accompanying drawings in which like references indicate similar elements.

FIG. 1 is a block diagram illustrating a system according to one embodiment.

FIG. 2 is a block diagram illustrating a system for offloading encryption to a client, according to one embodiment.

DESCRIPTION OF EMBODIMENTS

Figure 3A:
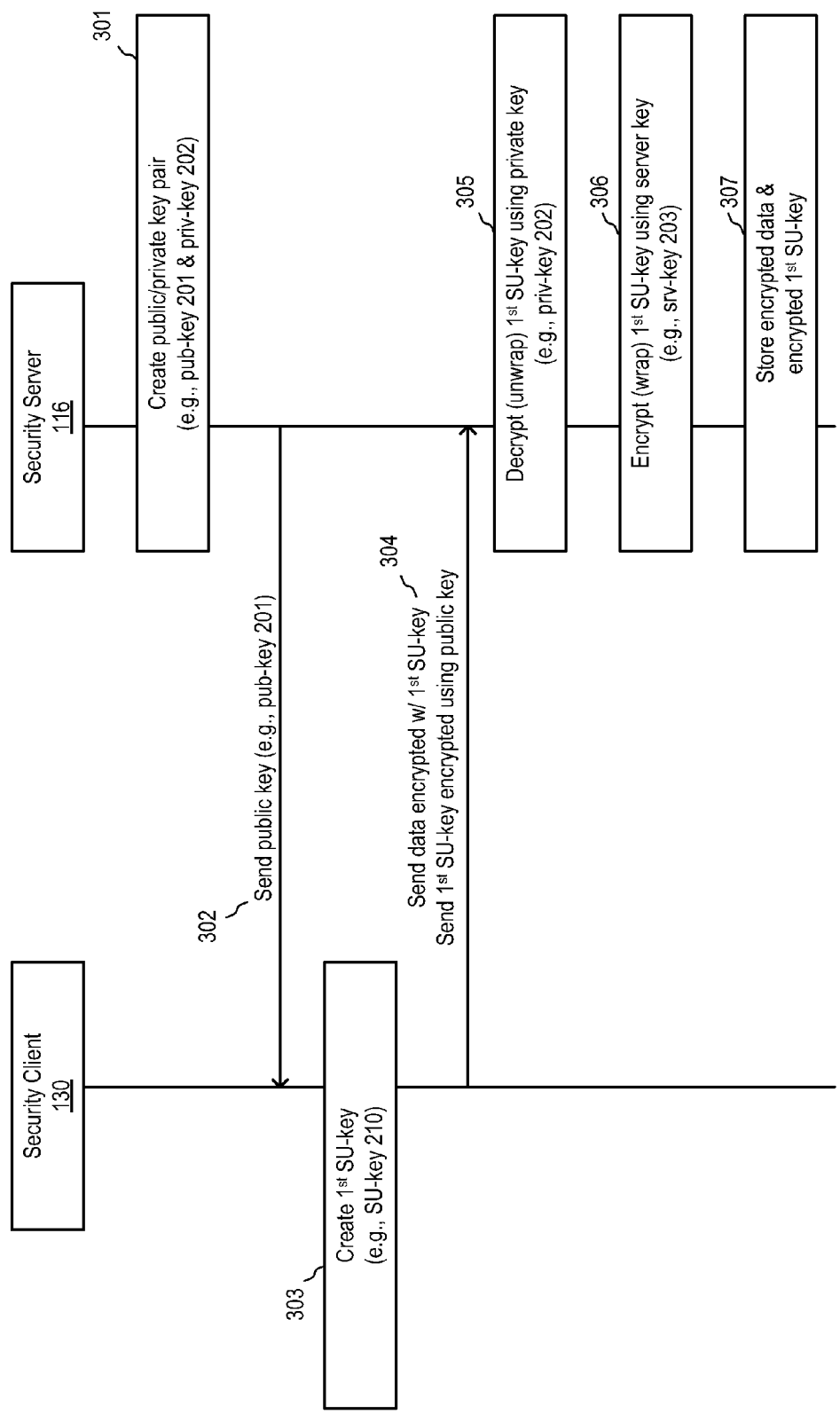
FIG. 3A is a flow diagram illustrating transactions for offloading encryption to a client, according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Techniques for offloading encryption to remote clients are described herein. In one aspect of the invention, a security server associated with a storage system creates a public/private key pair, and sends the public key to a security client located at a first remote client, while the security server and/or the storage system maintain the private key. In one embodiment, the security client of the first remote client creates a first single-use key (SU-key). In response to receiving a request (e.g., from a user) to backup data to the storage system, the security client located at the first remote client encrypts the data using the first SU-key, and encrypts the first SU-key using the public key received from the storage system. In one embodiment, the first remote client sends the encrypted data and encrypted first SU-key to the storage system.

In one embodiment, in response to receiving the encrypted data and encrypted first SU-key from the first remote client, the security server decrypts (unwraps) the received encrypted first SU-key using the private key to reveal or recover the first SU-key. In one embodiment, the security server then re-encrypts (re-wraps) the decrypted first SU-key using a server key. In one embodiment, the server key is available only to the storage system (i.e., not sent to the remote clients). The security server does not perform decryption or encryption on the received encrypted data, thus avoiding wasting computational resources. In one embodiment, the storage system stores the received encrypted data and the re-encrypted first SU-key in a storage unit. The security server may be integrated with or local with respect to the storage system or alternatively, the security server may be external or remote to the storage system, but is communicatively coupled to the storage system.

In response to receiving a request (e.g., from a user) at a second remote client to restore data from the storage system, a security client of the second remote client creates a second SU-key. The security client encrypts the second SU-key using the public key (that has been previously received from the security server), and sends the encrypted second SU-key along with the request to the storage system. In response to the request, the security server decrypts the second SU-key using the private key.

According to one embodiment, in response to the request, the storage system retrieves from storage the encrypted data and corresponding encrypted first SU-key. In such an embodiment, the security server decrypts the retrieved first SU-key using the server key, and re-encrypts the first SU-key using the second SU-key received as part of the request. The security server does not decrypt and re-encrypt the retrieved data, thus avoiding wasting computational resources. The storage system then sends the encrypted data and re-encrypted first SU-key (e.g., using the second SU-key) to the second remote client.

In one embodiment, the security client of the second remote client recovers the first SU-key by decrypting the received encrypted first SU-key using a local copy of the second SU-key. In one embodiment, the security client then decrypts the received encrypted data using the restored first SU-key. Note that the first remote client and the second remote client may be the same or different clients.

In another aspect of the invention, a security server located at a storage system creates a first SU-key, and sends the first SU-key to a security client located at a first remote client over a first secure channel (e.g., a virtual private network or VPN connection). In one embodiment, in response to receiving a request (e.g., from a user) to backup or migrate data to the storage system, the security client located at the first remote client encrypts the data using the first SU-key, and encrypts the first SU-key using the same first SU-key received from the storage system. In one embodiment, the first client sends the encrypted data and encrypted first SU-key to the storage system.

In one embodiment, in response to receiving the encrypted data and encrypted first SU-key from the first remote client, the security server decrypts (unwraps) the received encrypted first SU-key using a local copy of the first SU-key. In one embodiment, the security server verifies that the decrypted received first SU-key matches a local copy of the first SU-key. In one embodiment, if the verification fails (i.e., the keys do not match), the storage system does not store the received data. In one embodiment, in response to determining the verification was successful (e.g., matched keys), the security server then re-encrypts (wraps) the decrypted first SU-key using a server key. In one embodiment, the server key is available only to the storage system (i.e., not sent to the remote clients). The security server does not perform decryption or encryption on the received encrypted data, thus avoiding wasting computational resources. In one embodiment, the storage system stores the received encrypted data and the re-encrypted first SU-key in a storage unit.

In one embodiment, in response to receiving a request (e.g., from a user) at a second remote client to restore data from the storage system, the security client of the second remote client sends the request to the storage system. In response to the request, the storage system retrieves from storage the encrypted data and corresponding encrypted first SU-key. In such an embodiment, the security server decrypts the retrieved first SU-key using the server key, and re-encrypts the first SU-key using a second SU-key, where the second SU-key has been previously sent to the second remote client via a second secure channel. The security server does not decrypt and re-encrypt the retrieved data, thus avoiding wasting computational resources. The storage system then sends the encrypted data and re-encrypted first SU-key (e.g., by the second SU-key) to the second remote client.

In one embodiment, the security client of the second remote client restores the first SU-key by decrypting the received encrypted first SU-key using a local copy of the second SU-key that has been previously received from the security server. In one embodiment, the security client then decrypts the received encrypted data using the restored first SU-key. Note that again, the first and second remote clients may be the same or different clients communicatively coupled to the security server and/or the storage system.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

In one embodiment, clients 101-102 include security clients 130-131, respectively, for encrypting data sent to storage system 104, and decrypting data received from storage system 104. In one such embodiment, security clients 130-131 are configured to exchange various security keys with storage system 104. Alternatively, or in addition to, security clients 130-131 can be configured to generate some of the security keys. According to some embodiments, by performing data encryption and decryption using the mechanisms of the present invention, security clients 130-131 can offload a significant amount of the security computation that are traditionally required of a conventional storage system. The encryption and decryption mechanisms of the present invention shall become apparent through the description of other figures below.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 104 includes one or more network interfaces (not shown) for communicating with other networked devices (e.g., clients 101-102). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

According to one embodiment, backup/restore engine 106 is responsible for backing up data from remote clients (e.g., clients 101-102) to one or more local storage units (e.g., storage units 108-109). Backup/restore engine 106 is also responsible for restoring data from one or more local storage units to the remote clients. In one embodiment, backup/restore engine 106 includes security server or logic 116 configured to interface with remote security clients (e.g., security clients 130-131) to provide encryption without wasting computational resources in decrypting user data only then to re-encrypt it. Various embodiments of offloading data encryption to remote clients shall become apparent through the discussion of other figures below.

FIG. 2 is a block diagram illustrating security server 116 and security client 130, according to an embodiment. System 200 of FIG. 2 is similar to system 100 of FIG. 1, except that certain details have been omitted in order to avoid obscuring the invention. Referring now to FIG. 2. According to one embodiment, security server 116 is configured to provide asymmetric cryptography in order to communicate securely with remote clients. Asymmetric cryptography refers to a cryptographic algorithm which requires two separate keys, one of which is secret (or private) and one of which is public. Although different, the two parts of this key pair are mathematically linked. The public key is used to encrypt plaintext or to verify a digital signature. The private key is used to decrypt ciphertext or to create a digital signature. The term "asymmetric" stems from the use of different keys to perform these opposite functions, each the inverse of the other—as contrasted with conventional ("symmetric") cryptography which relies on the same key to perform both.

Public-key algorithms are based on mathematical properties which currently admit no efficient solution that are inherent in certain integer factorization, discrete logarithm, and elliptic curve relationships. It is computationally easy for a user to generate their own public and private key-pair and to use them for encryption and decryption. The encryption strength lies in the fact that it is "impossible" (computationally infeasible) for a properly generated private key to be determined from its corresponding public key. Thus, the public key may be published without compromising security, whereas the private key must not be revealed to anyone not authorized to read messages or perform digital signatures. Public key algorithms, unlike symmetric key algorithms, do not require a secure initial exchange of one (or more) secret keys between the parties.

In an embodiment where security server 116 is configured to provide asymmetric cryptography, security manger 116 generates a public key (herein referred to as pub-key) and private key (herein referred to as priv-key) pair for each remote client. Alternatively, a pub-key/priv-key pair may be shared by multiple remote clients. In the illustrated example, security server 116 generates pub-key 201 and priv-key 202. Security server 116 sends pub-key 201 to security client 130, and retains priv-key 202.

According to one embodiment, security server 116 is also configured to generate a server key (herein referred to as srv-key). In one embodiment, the srv-key is available only to security server 116 (i.e., the srv-key is not shared with remote clients). According to one embodiment, security server 116 generates srv-key 203 for performing at-rest encryption of the keys that were used by the remote clients to encrypt (and sent along with) the data. In such an embodiment, security server 116 is able to avoid wasting computational resources because it is configured to only perform at-rest encryption of the keys that were used to encrypt the data, without having to perform at-rest encryption of the data itself when the data is stored locally.

According to one embodiment, security client 130 is configured to generate ephemeral single-use keys (also commonly known as cryptographic nonces). As used herein, single-use keys (herein be referred to simply as SU-keys) refer to keys that are valid for a brief duration of time or within a particular communications session or user session. By employing short-lived SU-keys, an embodiment of the invention reduces the vulnerability window (e.g., when client 101 is compromised) while requiring some computational resources to generate the SU-keys. According to one embodiment, SU-keys can be implemented using a cryptographic pseudo random number (PRN). In the illustrated example, security client 130 generates SU-keys 210-211. It shall be understood that only one SU-key is valid at a time. For example, SU-key 210 may be valid during a first time duration, and when it is no longer valid, SU-key 211 becomes valid. Again, a first client that sends or stores encrypted data in storage system 104 and a second client that retrieves or restores the encrypted data from the storage system 104 may be the same client or different clients.

FIG. 3A is a flow diagram illustrating the transactions for offloading data encryption to a client, according to one embodiment. The transactions of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

The transactions of flow diagram 3A shall be discussed with reference to the example illustrated in FIG. 2. Referring now to FIG. 3A, at transaction 301, security server 116 creates a public/private key pair (e.g., pub-key 201 and priv-key 202). At transaction 302, security server 116 sends the public key to security client 130. At transaction 303, security client 130 creates a first SU-key (e.g., SU-key 210).

At transaction 304, in response to a request to send data to storage system 104, security client 130 encrypts the data with the first SU-key. For example, security client 130 encrypts data 220 using SU-key 210. Security client 130 also encrypts the first SU-key with the public key. For example, security client 130 encrypts SU-key 210 with pub-key 201. As part of transaction 304, security client 130 sends the encrypted data and encrypted first SU-key to security server 116.

At transaction 305, in response to receiving the encrypted data and encrypted first SU-key, security server 116 decrypts the first SU-key using a private key. For example, security server 116 decrypts SU-key 210 using priv-key 202. At transaction 306, security server 116 encrypts the decrypted first SU-key using a server key. For example, security server 116 encrypts SU-key 210 using srv-key 203. At transaction 307, security server 116 stores the encrypted data and re-encrypted first SU-key. Note that during the transactions above, contrary to a conventional storage system, the data itself is not decrypted and then re-encrypted by security server 116. As described above, the data is encrypted by remote client 101 using the SU-key. In other words, at-rest encryption of the data is offloaded to remote client 101. At-rest encryption of the first SU-key, however, is performed by security server 116 using the server key, which is only available to storage system 104. In order to access the data, the server key is required. Thus, an embodiment of the present invention provides the same level of security protection as a conventional storage system without having to waste computational resources in decrypting the data, and then re-encrypting it prior to storage. Note further that the data is encrypted using a SU-key, which is short-lived. Thus, even if remote client 101 is compromised, only data that was stored during the short duration of when the compromised SU-key was utilized is at risk of being accessed by an unauthorized source.

Figure 3B:
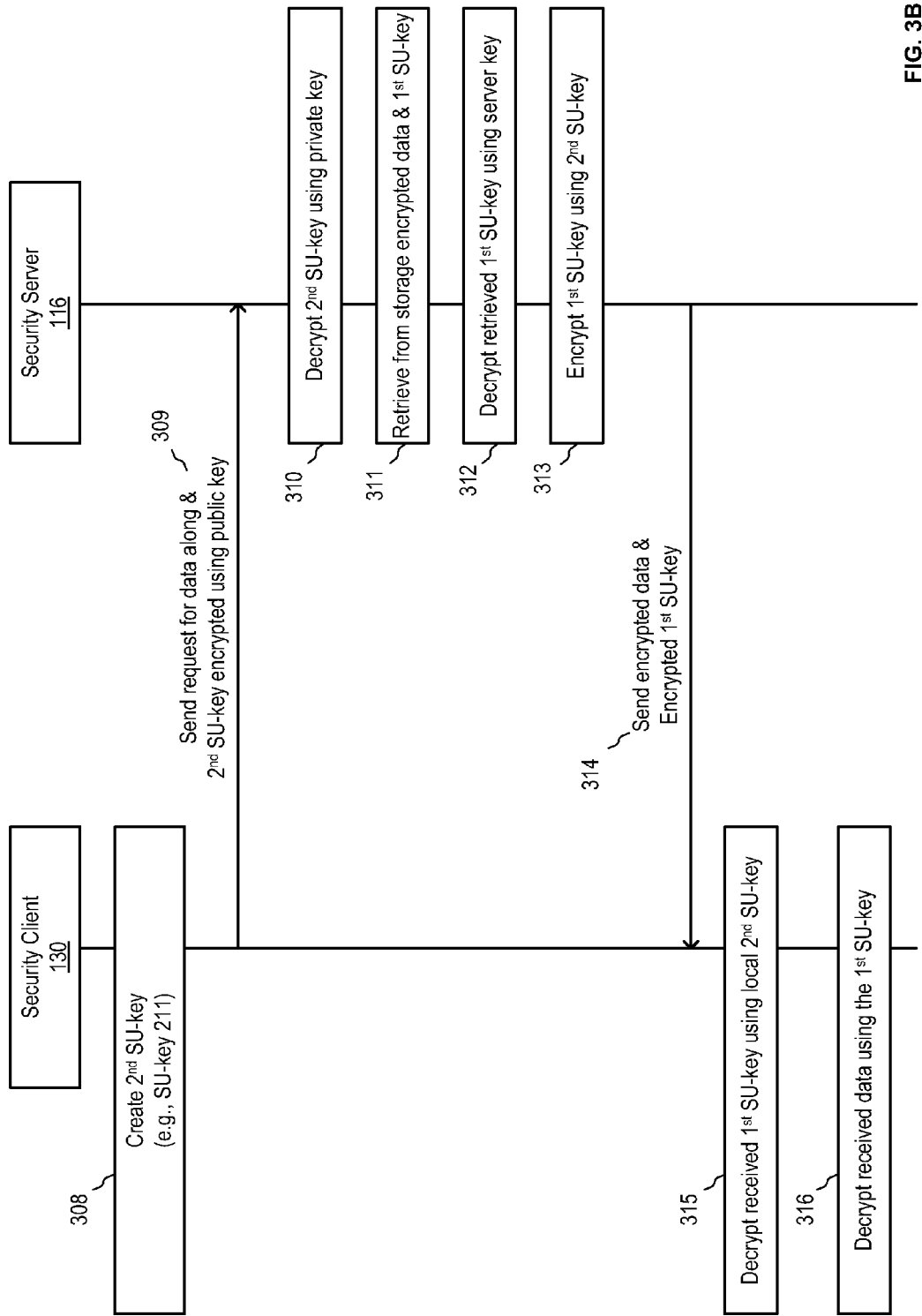
FIG. 3B is a flow diagram illustrating transactions for offloading encryption to a client, according to one embodiment.

FIG. 3B is a flow diagram illustrating the transactions for offloading data encryption to a client, according to one embodiment. The transactions of flow diagram 3B shall be discussed with reference to the example illustrated in FIG. 2. Referring now to FIG. 3B, at transaction 308, security client 130 creates a second SU-key. For example, security client 130 creates SU-key 211.

At transaction 309, security client 130 sends a request for data. In one embodiment, the request includes the second SU-key which has been encrypted using a public key. For example, security client 130 includes in the request SU-key 211 which has been encrypted using pub-key 201. At transaction 310, in response to the request, security server 116 decrypts the second SU-key using a private key. For example, security server 116 uses priv-key 202 to decrypt encrypted SU-key 211.

At transaction 311, security server 116 retrieves from storage the requested data and the corresponding SU-key that was used to encrypt the data. For example, security server 116 retrieves from storage data 220 which has been encrypted by SU-key 210 and corresponding SU-key 210 which has been encrypted by srv-key 203.

At transaction 312, security server 116 decrypts the retrieved SU-key using the server key. For example, security server 116 decrypts SU-key 210 using srv-key 203. At transaction 313, security server 116 encrypts the decrypted first SU-key using the second SU-key that was received as part of the data request. For example, security server 116 encrypts SU-key 210 using SU-key 211. At transaction 314, security server 116 sends to security client 130 the requested encrypted data along with the encrypted first SU-key that was used to encrypt the data. For example, security server 116 sends to security client 130 data 220 which has been encrypted by SU-key 210, and SU-key 210 which has been encrypted by SU-key 211.

At transaction 315, in response to receiving the requested encrypted data and encrypted first SU-key, security client 130 recovers the first SU-key that was used to encrypt the data by decrypting the received encrypted first SU-key using the second SU-key that was sent as part of the data request to security server 116. For example, security client 130 uses SU-key 211 to decrypt encrypted SU-key 210 in order to recover unencrypted SU-key 210 that was used to encrypt data 220. At transaction 316, security client 130 uses the recovered first SU-key to decrypt the received encrypted data.

Note that during the transactions above, contrary to a conventional storage system, security server 116 does not decrypt the retrieved data (at-rest decryption), and re-encrypt the data (encryption-on-wire) prior to transmitting the data to requesting client 101. Rather, the data is sent to security client 130 as it was originally encrypted by security client 130. Thus, security server 116 is able to avoid wasting computational resources. The first SU-key that was used to encrypt the data, however, is re-encrypted by security server 116 using the current/second SU-key (e.g., SU-key 211). Thus, unless client 101 is compromised during the entire time when both SU-keys 210 and 211 were utilized, a compromised client 101 would not be able to access data 220. Accordingly, by re-encrypting only the key that was used to encrypt the data, an embodiment of the present invention provides the same security protection of a conventional storage system, without having to waste computational resources in decrypting and re-encrypting the data, which is typically much bigger in size than the key, thus requiring more computational resources.

Throughout the description, the security mechanisms of the present invention are described with respect to one remote security client (e.g., security client 130 of client 101). It shall be understood, however, that the present invention can be extended to multiple security clients (including, for example, security client 131 of client 102). In particular, the backup operations (e.g., described in the text with respect to FIG. 3A) can be performed by one remote client (e.g., remote client 101), while the restore operations (e.g., described in the text with respect to FIG. 3B) can be performed by another remote client (e.g., remote client 102).

Figure 4:
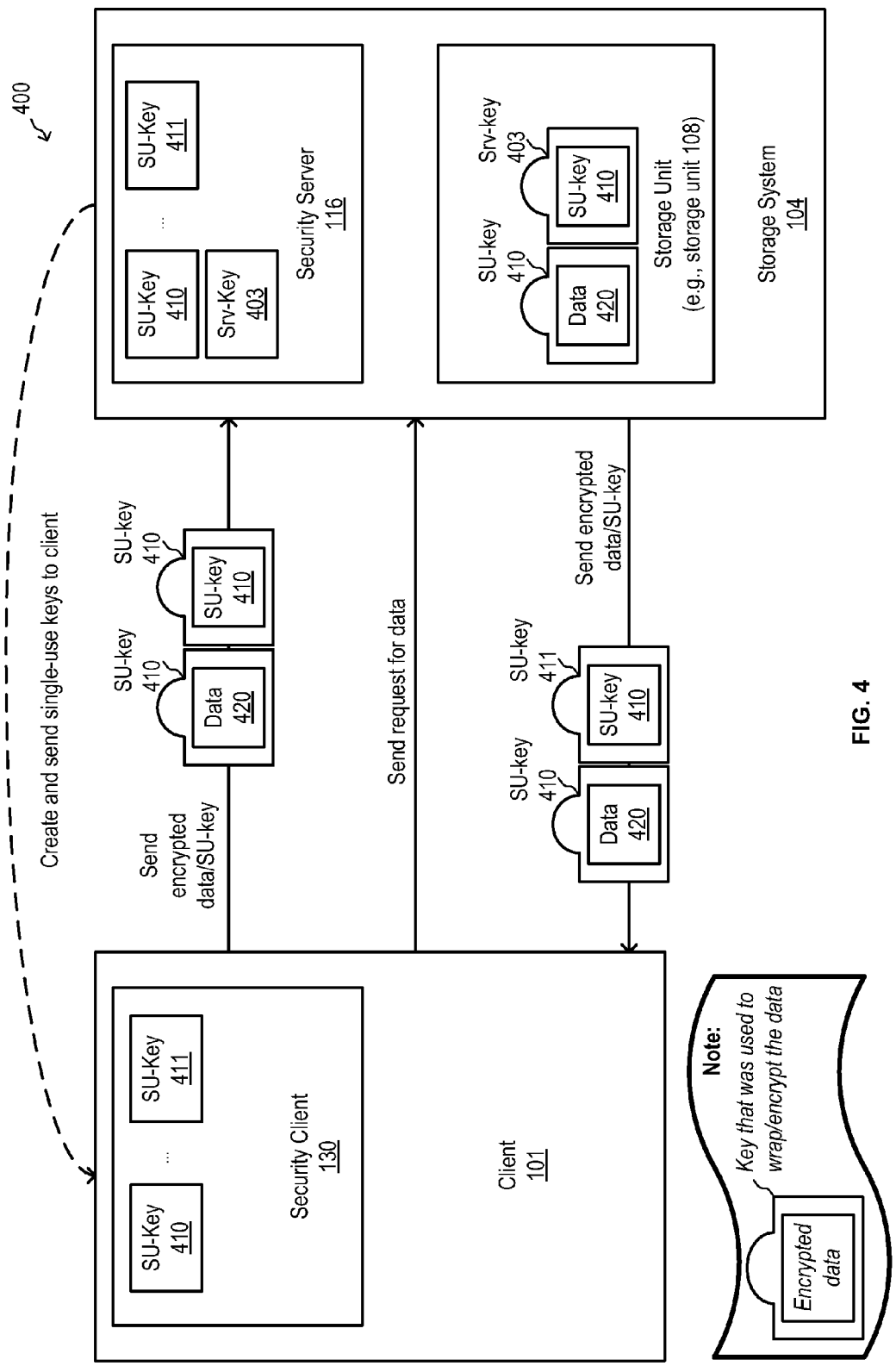
FIG. 4 is a block diagram illustrating a system for offloading encryption to a client, according to one embodiment.

FIG. 4 is a block diagram illustrating security server 116 and security client 130, according to an embodiment. System 400 of FIG. 4 is similar to system 100 of FIG. 1, except that certain details have been omitted in order to avoid obscuring the invention. Referring now to FIG. 4. According to one embodiment, security server 116 is configured to generate SU-keys, which can be implemented using a cryptographic pseudo random number (PRN). In the illustrated example, security server 116 generates SU-keys 410-411. It shall be understood that only one SU-key is valid at a time. For example, SU-key 410 may be valid during a first time duration, and when it is no longer valid, SU-key 411 becomes valid.

In one aspect of the invention, security server 116 is configured to generate unique SU-keys for each remote client. Alternatively, security server 116 can be configured to generate SU-keys that are shared by multiple remote clients. Once a SU-key is generated, security server 116 sends it to one or more remote clients. In the illustrated example, security server 116 sends SU-keys 410-411 to security client 130 of client 101.

According to one embodiment, security server 116 is also configured to generate a srv-key. In one embodiment, the srv-key is available only to security server 116 (i.e., the srv-key is not shared with remote clients). According to one embodiment, security server 116 generates srv-key 203 for performing at-rest encryption of the keys that were used by the remote clients to encrypt (and sent along with) the data. In such an embodiment, security server 116 is able to avoid wasting computational resources because it is configured to only perform at-rest encryption of the keys that were used to encrypt the data, without having to perform at-rest encryption of the data itself when the data is stored locally.

Figure 5A:
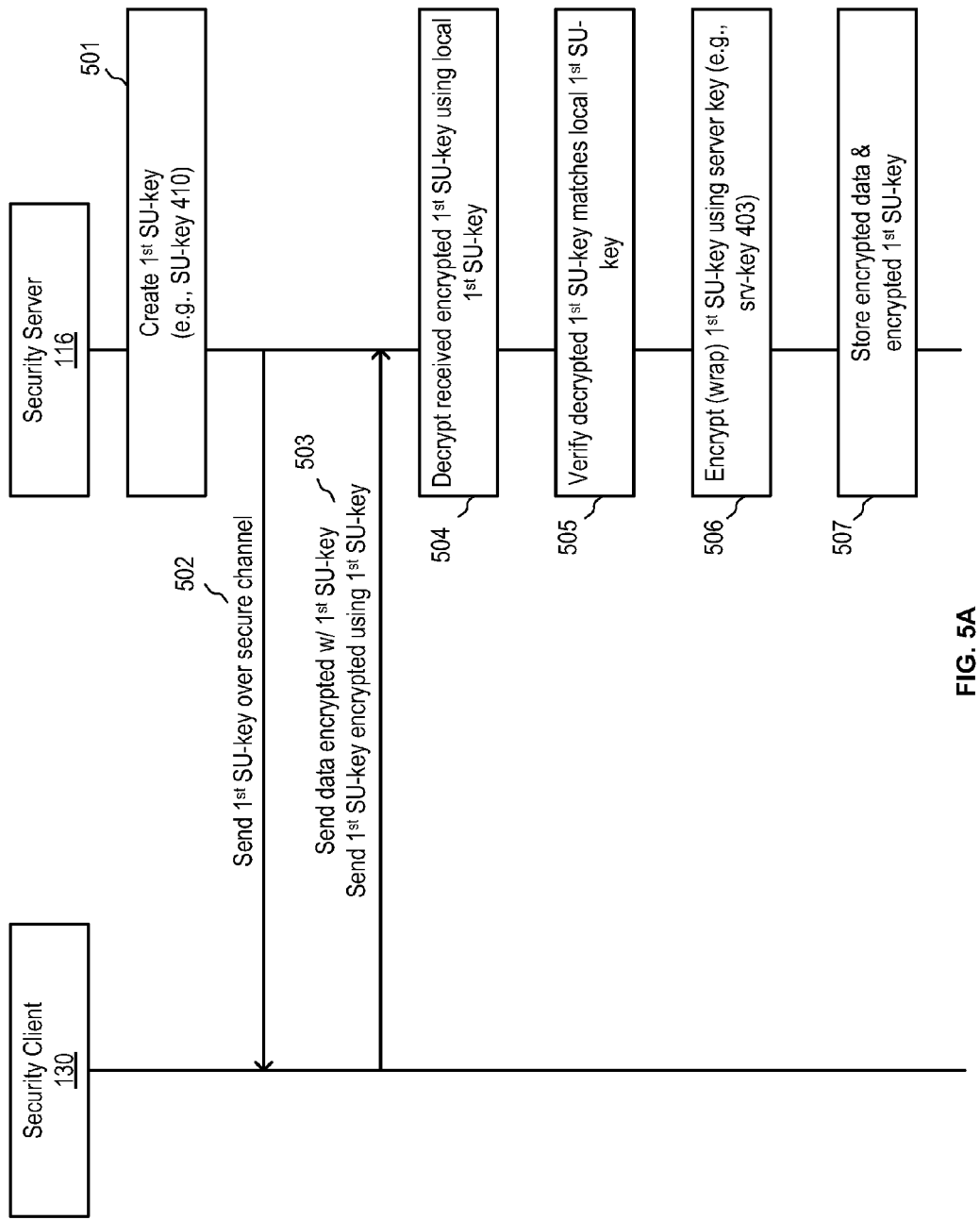
FIG. 5A is a flow diagram illustrating transactions for offloading encryption to a client, according to one embodiment.

FIG. 5A is a flow diagram illustrating the transactions for offloading data encryption to a client, according to one embodiment. The transactions of flow diagram 5A shall be discussed with reference to the example illustrated in FIG. 4. Referring now to FIG. 5A, at transaction 501, security server 116 creates a first SU-key (e.g., SU-key 410). At transaction 502, security server 116 sends the first SU-key to security client 130 over a secure channel. At transaction 503, in response to a request to store data at storage system 104, security client 130 encrypts the data using the first SU-key, and encrypts the first SU-key with the first SU-key itself. For example, security client 130 encrypts data 420 with SU-key 410, and encrypts SU-key 410 with SU-key 410. As part of transaction 503, security client 130 sends the encrypted data and corresponding encrypted first SU-key to security server 116.

At transaction 504, in response to receiving the encrypted data and encrypted first SU-key, security server 116 decrypts the first SU-key using a local copy of the first SU-key. For example, security server 116 decrypts SU-key 210 using a local copy of SU-key 210. At transaction 505, security server 116 verifies that the decrypted received first SU-key matches the local copy of the first SU-key. For example, security server 116 verifies that the received SU-key 410 matches the local copy of SU-key 410. In one embodiment, if the verification fails (i.e., the SU-keys do not match), security server 116 does not store the received data.

At transaction 506, in response to determining the verification is successful, security server 116 encrypts the decrypted first SU-key using a server key. For example, security server 116 encrypts SU-key 410 using srv-key 403. At transaction 507, security server 116 stores the encrypted data and re-encrypted first SU-key. Note that during the transactions above, contrary to a conventional storage system, the data itself is not decrypted and then re-encrypted by security server 116. As described above, the data is encrypted by remote client 101 using the SU-key. In other words, at-rest encryption of the data is offloaded to remote client 101. At-rest encryption of the first SU-key, however, is performed by security server 116 using the server key, which is only available to storage system 104. In order to access the data, the server key is required. Thus, an embodiment of the present invention provides the same level of security protection as a conventional storage system without having to waste computational resources in decrypting the data, and then re-encrypting it prior to storage. Note further that the data is encrypted using a SU-key, which is short-lived. Thus, even if remote client 101 is compromised, only data that was stored during the short duration of when the compromised SU-key was utilized is at risk of being accessed by an unauthorized source.

Figure 5B:
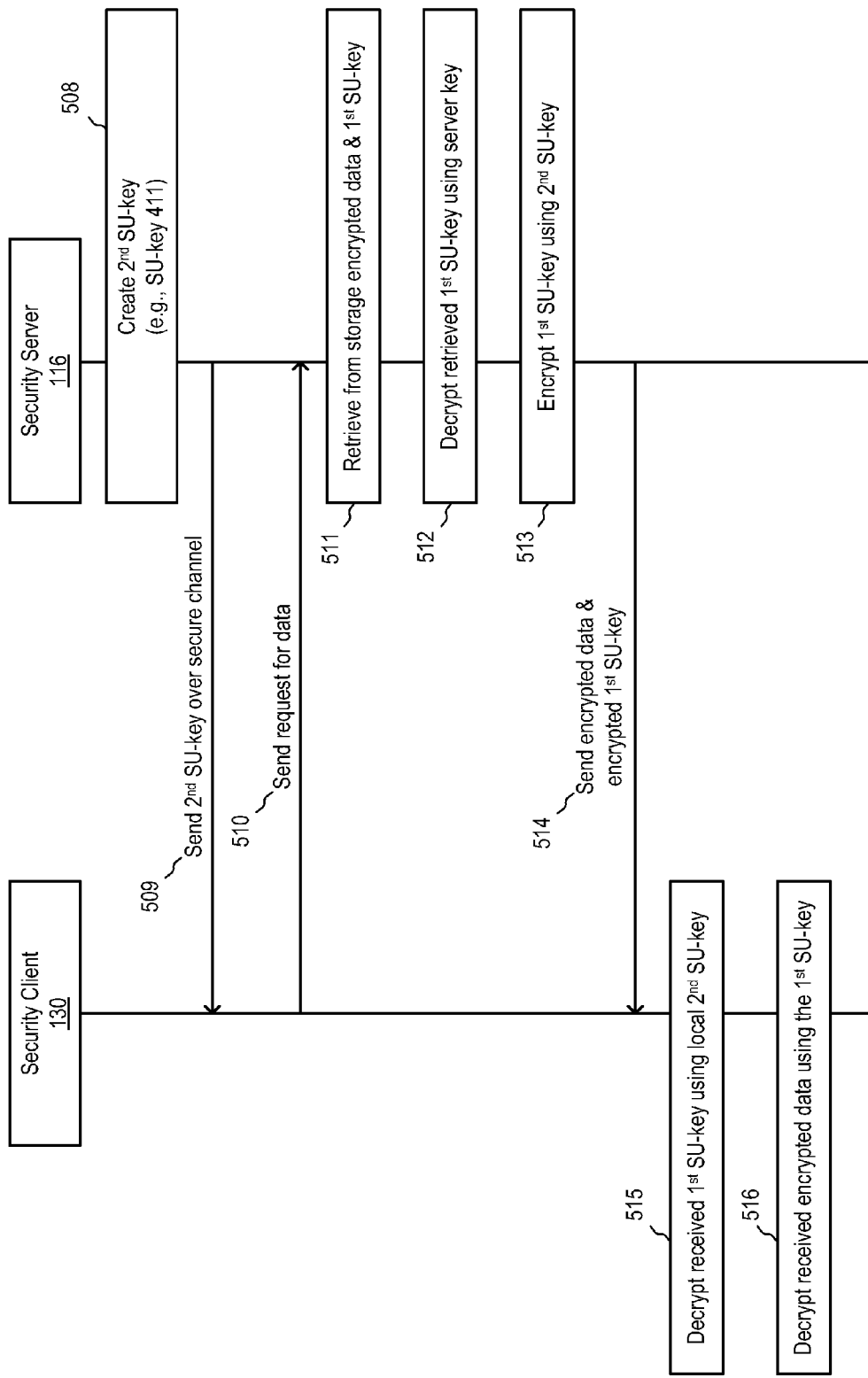
FIG. 5B is a flow diagram illustrating transactions for offloading encryption to a client, according to one embodiment.

FIG. 5B is a flow diagram illustrating the transactions for offloading data encryption to a client, according to one embodiment. The transactions of flow diagram 5B shall be discussed with reference to the example illustrated in FIG. 4. Referring now to FIG. 5B, at transaction 508, security server 116 creates a second SU-key. For example, security server 116 creates SU-key 211. At transaction 509, security server 116 sends the second SU-key to security client 130 over a secure channel.

At transaction 510, security client 130 sends a request for data. At transaction 511, in response to the request, security server 116 retrieves from storage the requested data and the corresponding SU-key that was used to encrypt the data. For example, security server 116 retrieves from storage data 420 which has been encrypted by SU-key 410 and corresponding SU-key 410 which has been encrypted by srv-key 403.

At transaction 512, security server 116 decrypts the retrieved SU-key using the server key. For example, security server 116 decrypts SU-key 410 using srv-key 403. At transaction 513, security server 116 encrypts the decrypted first SU-key using a local copy of a second SU-key. For example, security server 116 encrypts SU-key 410 using SU-key 411.

At transaction 514, security server 116 sends to security client 130 the requested encrypted data along with the encrypted first SU-key that was used to encrypt the data. For example, security server 116 sends to security client 130 data 420 which has been encrypted by SU-key 410, and SU-key 410 which has been encrypted by SU-key 411.

At transaction 515, in response to receiving the requested encrypted data and encrypted first SU-key, security client 130 recovers the first SU-key that was used to encrypt the data by decrypting the received encrypted first SU-key using a local copy of the second SU-key. For example, security client 130 uses SU-key 411 to decrypt encrypted SU-key 410 in order to recover unencrypted SU-key 410 that was used to encrypt data 420. At transaction 516, security client 130 uses the recovered first SU-key to decrypt the received encrypted data.

Note that during the transactions above, contrary to a conventional storage system, security server 116 does not decrypt the retrieved data (at-rest decryption), and re-encrypt the data (encryption-on-wire) prior to transmitting the data to requesting client 101. Rather, the data is sent to security client 130 as it was originally encrypted by security client 130. Thus, security server 116 is able to avoid wasting computational resources. The first SU-key that was used to encrypt the data, however, is re-encrypted by security server 116 using the current/second SU-key (e.g., SU-key 411). Thus, unless client 101 is compromised during the entire time when both SU-keys 410 and 411 were valid/utilized, a compromised client 101 would not be able to access data 420. Accordingly, by re-encrypting only the key that was used to encrypt the data, an embodiment of the present invention provides the same security protection of a conventional storage system, without having to waste computational resources in decrypting and re-encrypting the data, which is typically much bigger in size than the key, thus requiring more computational resources.

Embodiments of the present invention have been described with respect to one remote security client (e.g., security client 130 of client 101). It shall be understood, however, that the present invention can be extended to multiple security clients (including, for example, security client 131 of client 102). In particular, the backup operations (e.g., described in the text with respect to FIG. 5A) can be performed by one remote client (e.g., remote client 101), while the restore operations (e.g., described in the text with respect to FIG. 5B) can be performed by another remote client (e.g., remote client 102).

Figure 6:
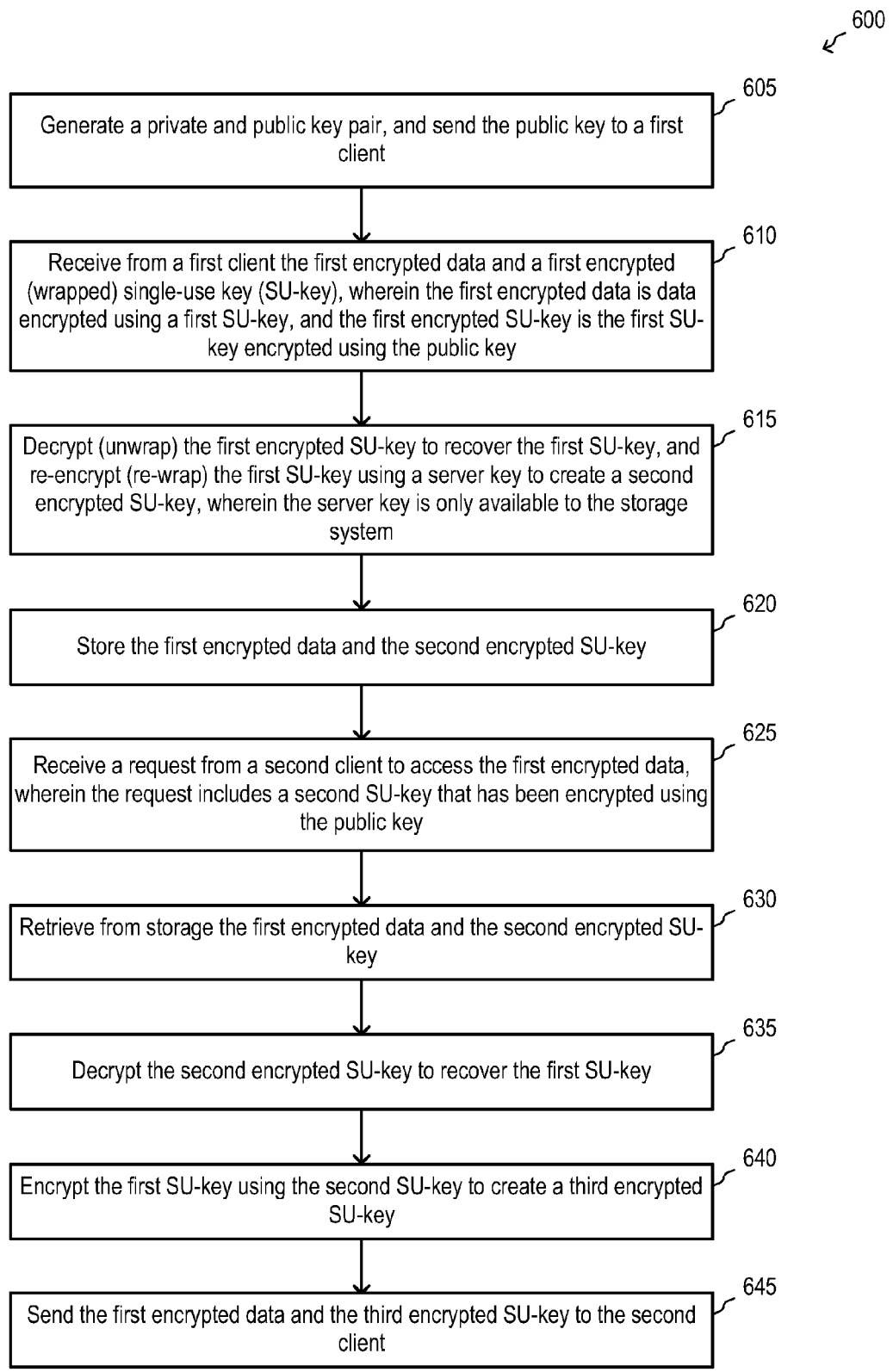
FIG. 6 is a flow diagram illustrating a method for offloading encryption to a client, according to one embodiment.

FIG. 6 is a flow diagram illustrating method 600 for offloading encryption to a remote client, according to one embodiment. For example, method 600 can be performed by storage system 104, such as security server 116 of storage system 104. Referring now to method 600, at block 605, the storage system generates a private and public key pair, and send the public key to a first client (e.g., as part of transactions 301-302).

At block 610, the storage system receives from the first client a first encrypted data and a first encrypted (wrapped) single-use key (SU-key), wherein the first encrypted data is data encrypted using a first SU-key, and the first encrypted SU-key is the first SU-key encrypted using the public key. For example, the operations of block 610 can be performed as part of transaction 304.

At block 615, the storage system decrypts (unwraps) the first encrypted SU-key to recover the first SU-key, and re-encrypts (re-wraps) the first SU-key using a server key to create a second encrypted SU-key, wherein the server key is only available to the storage system. For example, the operations of block 615 can be performed as part of transactions 305-306.

At block 620, the storage system stores the first encrypted data and the second encrypted SU-key (e.g., as part of transaction 307). At block 625, the storage system receives a request from a second client to access the first encrypted data, wherein the request includes a second SU-key that has been encrypted using the public key. For example, the operations of block 625 can be performed as part of transaction 309.

At block 630, the storage system retrieves from storage the first encrypted data and the second encrypted SU-key (e.g., as part of transaction 311). At block 635, the storage system decrypts the second encrypted SU-key to recover the first SU-key (e.g., as part of transaction 312). At block 640, the storage system encrypts the first SU-key using the second SU-key to create a third encrypted SU-key (e.g., as part of transaction 313). At block 645, the storage system sends the first encrypted data and the third encrypted SU-key to the second client (e.g., as part of transaction 314).

Figure 7:
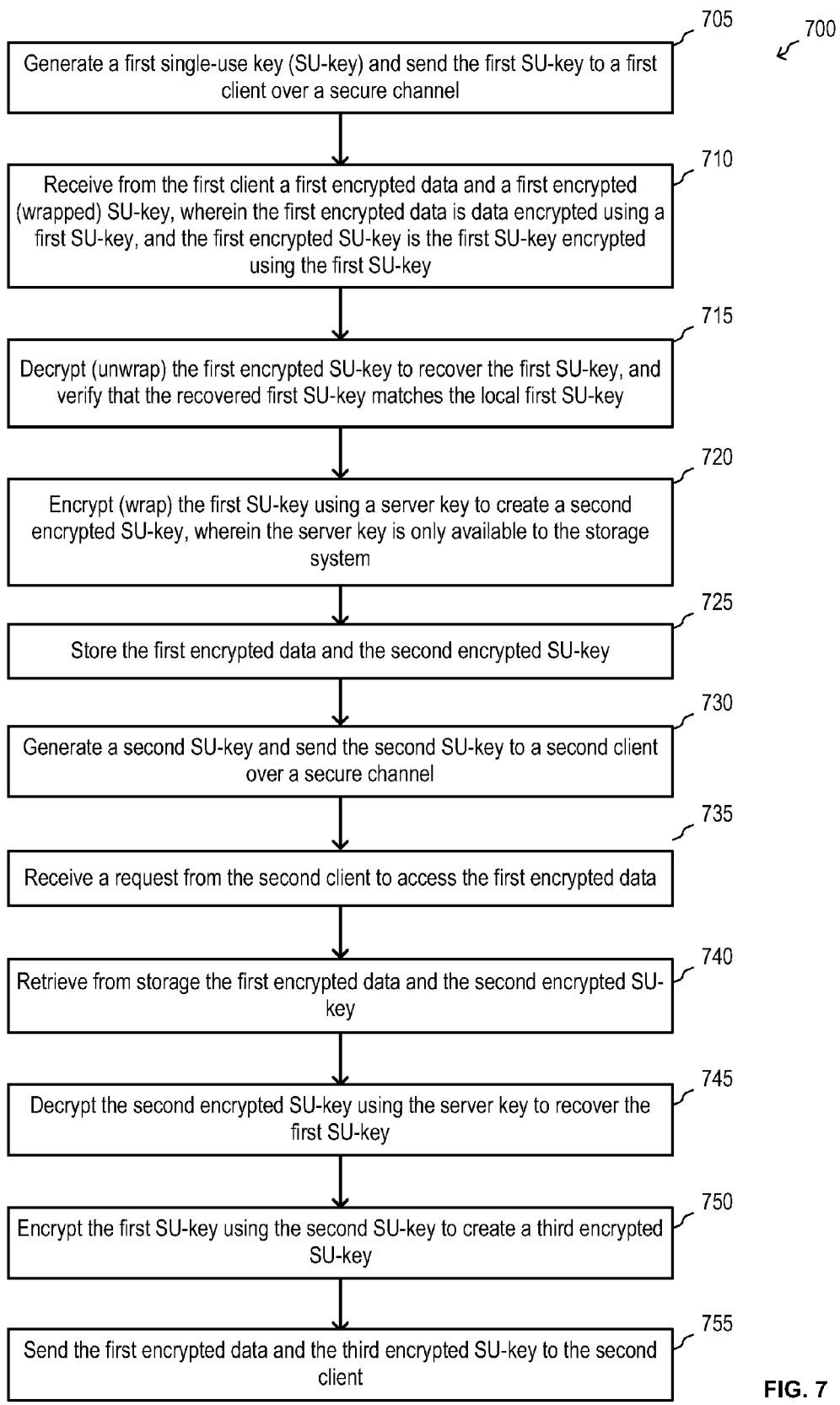
FIG. 7 is a flow diagram illustrating a method for offloading encryption to a client, according to one embodiment.

FIG. 7 is a flow diagram illustrating method 700 for offloading encryption to a remote client, according to one embodiment. For example, method 700 can be performed by storage system 104, such as security server 116 of storage system 104. Referring now to method 700, at block 705, the storage system generates a first single-use key (SU-key) and sends the first SU-key to a first client over a secure channel (e.g., as part of transactions 501-502).

At block 710, the storage system receives from the first client a first encrypted data and a first encrypted (wrapped) SU-key, wherein the first encrypted data is data encrypted using a first SU-key, and the first encrypted SU-key is the first SU-key encrypted using the first SU-key (e.g., as part of transaction 503). At block 715, the storage system decrypts (unwraps) the first encrypted SU-key to recover the first SU-key, and verifies that the recovered first SU-key matches the local first SU-key (e.g., as part of transactions 504-505).

At block 720, the storage system encrypts (wraps) the first SU-key using a server key to create a second encrypted SU-key, wherein the server key is only available to the storage system (e.g., as part of transaction 506). At block 725, the storage system stores the first encrypted data and the second encrypted SU-key (e.g., as part of transaction 507).

At block 730, the storage system generates a second SU-key and send the second SU-key to a second client over a secure channel (e.g., as part of transactions 508-509). At block 735, the storage system receives a request from the second client to access the first encrypted data (e.g., as part of transaction 510). At block 740, the storage system retrieves from storage the first encrypted data and the second encrypted SU-key (e.g., as part of transaction 511).

At block 745, the storage system decrypts the second encrypted SU-key using the server key to recover the first SU-key (e.g., as part of transaction 512). At block 750, the storage system encrypts the first SU-key using the second SU-key to create a third encrypted SU-key (e.g., as part of transaction 513). At block 755, the storage system sends the first encrypted data and the third encrypted SU-key to the second client (e.g., as part of transaction 755).

Figure 8:
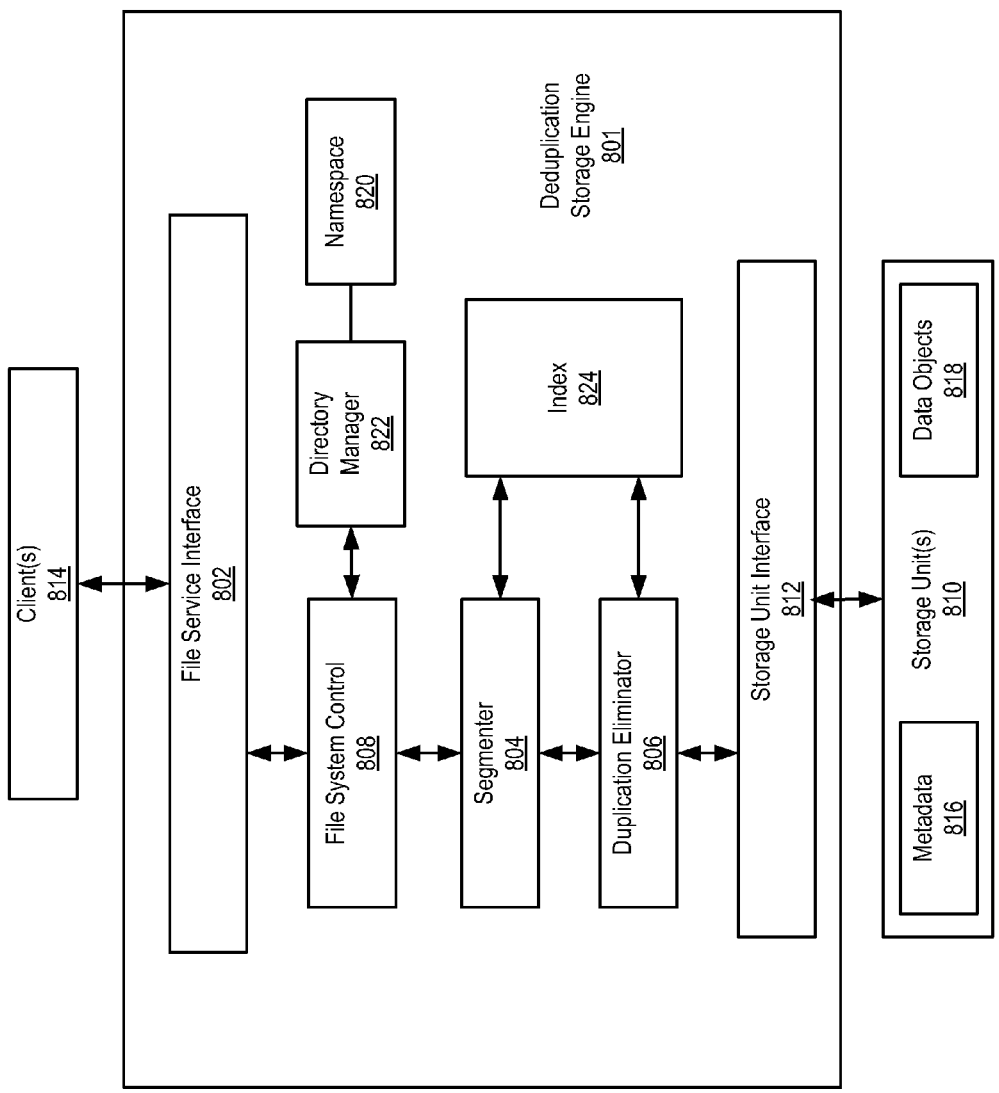
FIG. 8 is a block diagram illustrating a deduplication storage engine which can be used with embodiments of the invention.

FIG. 8 is a block diagram illustrating a deduplication storage system according to one embodiment of the invention. For example, deduplication storage system 800 may be implemented as part of a deduplication storage system as described above, such as, for example, the deduplication storage system as shown in FIG. 1. In one embodiment, storage system 800 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 800 may have a distributed architecture, or all of its components may be integrated into a single unit. Storage system 800 may be implemented as part of an archive and/or backup system such as a deduplicating storage system available from EMC® Corporation of Hopkinton, Mass.

In one embodiment, storage system 800 includes a deduplication engine 801 interfacing one or more clients 814 with one or more storage units 810 storing metadata 816 and data objects 818. Clients 814 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 810 may be implemented locally (e.g., single node operating environment) or remotely (e.g., multi-node operating environment) via an interconnect, which may be a bus and/or a network. In one embodiment, one of storage units 810 operates as an active storage to receive and store external or fresh user data, while the another one of storage units 810 operates as a target storage unit to periodically archive data from the active storage unit according to an archiving policy or scheme. Storage units 810 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 810 may also be combinations of such devices. In the case of disk storage media, the storage units 810 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 816, may be stored in at least some of storage units 810, such that files can be accessed independent of another storage unit. Metadata of each storage unit includes enough information to provide access to the files it contains. In one embodiment, metadata may include fingerprints contained within data objects 818, where a data object may represent a data segment, a compression region (CR) of data segments, or a container of one or more CRs. Fingerprints are mapped to a particular data object via metadata 816, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 801 includes file service interface 802, segmenter 804, duplicate eliminator 806, file system control 808, and storage unit interface 812. Deduplication storage engine 801 receives a file or files (or data item(s)) via file service interface 802, which may be part of a file system namespace 820 of a file system associated with the deduplication storage engine 801. The file system namespace 820 refers to the way files are identified and organized in the system. An example is to organize the files hierarchically into directories or folders, which may be managed by directory manager 822. File service interface 802 supports a variety of protocols, including a network file system (NFS), a common Internet file system (CIFS), and a virtual tape library interface (VTL), etc.

The file(s) is/are processed by segmenter 804 and file system control 808. Segmenter 804, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 808, also referred to as a file system manager, processes information to indicate the segment(s) association with a file. In some embodiments, a list of fingerprints is used to indicate segment(s) associated with a file. File system control 808 passes segment association information (e.g., representative data such as a fingerprint) to index 824. Index 824 is used to locate stored segments in storage units 810 via storage unit interface 812. Duplicate eliminator 806, also referred to as a segment store, identifies whether a newly received segment has already been stored in storage units 810. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 810 that make up the file. Segments are then packed by a container manager (which may be implemented as part of storage unit interface 812) into one or more storage containers stored in storage units 810. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 802 is configured to communicate with file system control 808 to identify appropriate segments stored in storage units 810 via storage unit interface 812. Storage unit interface 812 may be implemented as part of a container manager. File system control 808 communicates (e.g., via segmenter 804) with index 824 to locate appropriate segments stored in storage units via storage unit interface 812. Appropriate segments are retrieved from the associated containers via the container manager and are used to construct the requested file. The file is provided via interface 802 in response to the request. In one embodiment, file system control 808 utilizes a tree (e.g., a segment tree obtained from namespace 820) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 801 may be implemented in software, hardware, or a combination thereof. For example, deduplication engine 801 may be implemented in a form of executable instructions that can be stored in a machine-readable storage medium, where the instructions can be executed in a memory by a processor.

In one embodiment, storage system 800 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for encrypting data stored at a storage system, the method comprising:
   receiving from a first client a first encrypted data and a corresponding first encrypted key;
   decrypting the first encrypted key to recover a first key, without decrypting the first encrypted data;
   encrypting the first key using a second key to create a second encrypted key, wherein the second key is available only to the storage system;
   storing the second encrypted key and the first encrypted data as received, without having to decrypt and re-encrypt the first encrypted data;
   receiving from a second client a request to access the first encrypted data;
   in response to the request, retrieving from storage the second encrypted key and the first encrypted data;
   decrypting the second encrypted key retrieved from the storage to recover the first key;
   encrypting the first key using a third key to create a third encrypted key; and
   sending to the second client the third encrypted key and the first encrypted data as retrieved from the storage, without having to decrypt and re-encrypt the first encrypted data.

2. The method of claim 1, further comprising:
   prior to receiving the first encrypted data from the first client, generating a pair of keys including a public and private key, wherein the public key is used for encrypting data, and the private key is used for decrypting data that has been encrypted using the public key; and
   sending the public key to the first client.

3. The method of claim 2, wherein the first encrypted data is data encrypted using the first key, and the first encrypted key is the first key encrypted using the public key.

4. The method of claim 3, wherein the request from the second client to access the first encrypted data includes the third key.

5. The method of claim 4, wherein the third key included in the request is encrypted using the public key.

6. The method of claim 1, further comprising prior to receiving the first encrypted data from the first client, generating the first key, and sending the first key to the first client over a secure channel.

7. The method of claim 6, wherein the first encrypted data is data encrypted using the first key, and the first encrypted key is the first key encrypted using the first key.

8. A non-transitory computer-readable medium having computer instructions stored therein, which when executed by a processor, cause the processor to perform operations of encrypting data, the operations comprising:
   receiving from a first client a first encrypted data and a corresponding first encrypted key;
   decrypting the first encrypted key to recover a first key, without decrypting the first encrypted data;
   encrypting the first key using a second key to create a second encrypted key, wherein the second key is available only to the storage system;
   storing the second encrypted key and the first encrypted data as received, without having to decrypt and re-encrypt the first encrypted data;
   receiving from a second client a request to access the first encrypted data;
   in response to the request, retrieving from storage the second encrypted key and the first encrypted data;
   decrypting the second encrypted key retrieved from the storage to recover the first key;
   encrypting the first key using a third key to create a third encrypted key; and
   sending to the second client the third encrypted key and the first encrypted data as retrieved from the storage, without having to decrypt and re-encrypt the first encrypted data.

9. The non-transitory computer-readable medium of claim 8, wherein the operations further comprise:
   prior to receiving the first encrypted data from the first client, generating a pair of keys including a public and private key, wherein the public key is used for encrypting data, and the private key is used for decrypting data that has been encrypted using the public key; and
   sending the public key to the first client.

10. The non-transitory computer-readable medium of claim 9, wherein the first encrypted data is data encrypted using the first key, and the first encrypted key is the first key encrypted using the public key.

11. The non-transitory computer-readable medium of claim 10, wherein the request from the second client to access the first encrypted data includes the third key.

12. The non-transitory computer-readable medium of claim 11, wherein the third key included in the request is encrypted using the public key.

13. The non-transitory computer-readable medium of claim 8, wherein the operations further comprise prior to receiving the first encrypted data from the first client, generating the first key, and sending the first key to the first client over a secure channel.

14. The non-transitory computer-readable medium of claim 13, wherein the first encrypted data is data encrypted using the first key, and the first encrypted key is the first key encrypted using the first key.

15. A storage system, comprising:
a processor; and
a memory to store instructions, which when executed from the memory, cause the processor to
receive from a first client a first encrypted data and a corresponding first encrypted key;
decrypt the first encrypted key to recover a first key, without decrypting the first encrypted data;
encrypt the first key using a second key to create a second encrypted key, wherein the second key is available only to the storage system;
store the second encrypted key and the first encrypted data as received, without having to decrypt and re-encrypt the first encrypted data;
receive from a second client a request to access the first encrypted data;
in response to the request, retrieve from storage the second encrypted key and the first encrypted data;
decrypt the second encrypted key retrieved from the storage to recover the first key;
encrypt the first key using a third key to create a third encrypted key; and
send to the second client the third encrypted key and the first encrypted data as retrieved from the storage, without having to decrypt and re-encrypt the first encrypted data.

16. The storage system of claim 15, wherein the processor is further configured to:
prior to receiving the first encrypted data from the first client, generate a pair of keys including a public and private key, wherein the public key is used for encrypting data, and the private key is used for decrypting data that has been encrypted using the public key; and
send the public key to the first client.

17. The storage system of claim 16, wherein the first encrypted data is data encrypted using the first key, and the first encrypted key is the first key encrypted using the public key.

18. The storage system of claim 17, wherein the request from the second client to access the first encrypted data includes the third key.

19. The storage system of claim 18, wherein the third key included in the request is encrypted using the public key.

20. The storage system of claim 15, wherein the processor is further configured to prior to receiving the first encrypted data from the first client, generate the first key, and send the first key to the first client over a secure channel.

21. The storage system of claim 20, wherein the first encrypted data is data encrypted using the first key, and the first encrypted key is the first key encrypted using the first key.

* * * * *